(No Model.)

G. A. WASHBURN.
SECONDARY BATTERY.

No. 451,540. Patented May 5, 1891.

Witnesses
R. B. Moser.
N. S. Amstutz.

Inventor
George A. Washburn.
By his Attorney
H. T. Fisher.

UNITED STATES PATENT OFFICE.

GEORGE A. WASHBURN, OF CLEVELAND, OHIO, ASSIGNOR TO FORD & WASHBURN, OF SAME PLACE.

SECONDARY BATTERY.

SPECIFICATION forming part of Letters Patent No. 451,540, dated May 5, 1891.

Application filed July 23, 1890. Serial No. 359,666. (No model.)

*To all whom it may concern:*

Be it known that I, GEORGE A. WASHBURN, a citizen of the United States, residing at Cleveland, in the county of Cuyahoga and State of Ohio, have invented certain new and useful Improvements in Storage - Batteries; and I do hereby declare that the following is a full, clear, and exact description of the invention, which will enable others skilled in the art to which it appertains to make and use the same.

My invention relates to storage-batteries; and the invention consists in the construction substantially as shown and described, and particularly pointed out in the claims.

Figure 1:
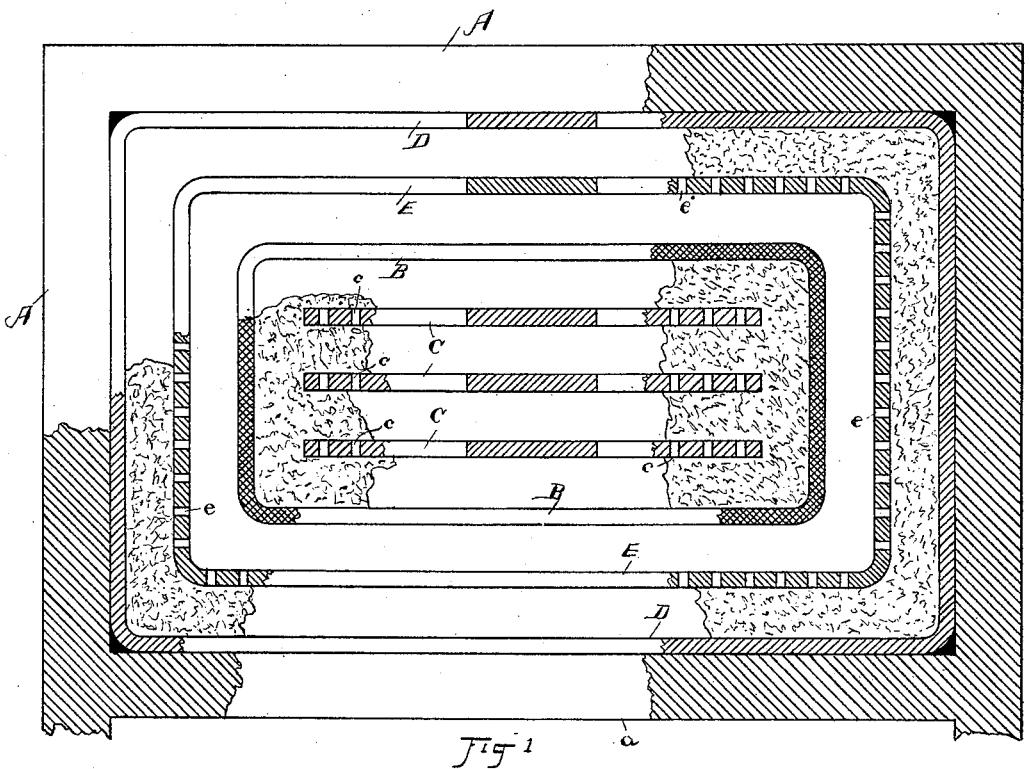
Figure 2:
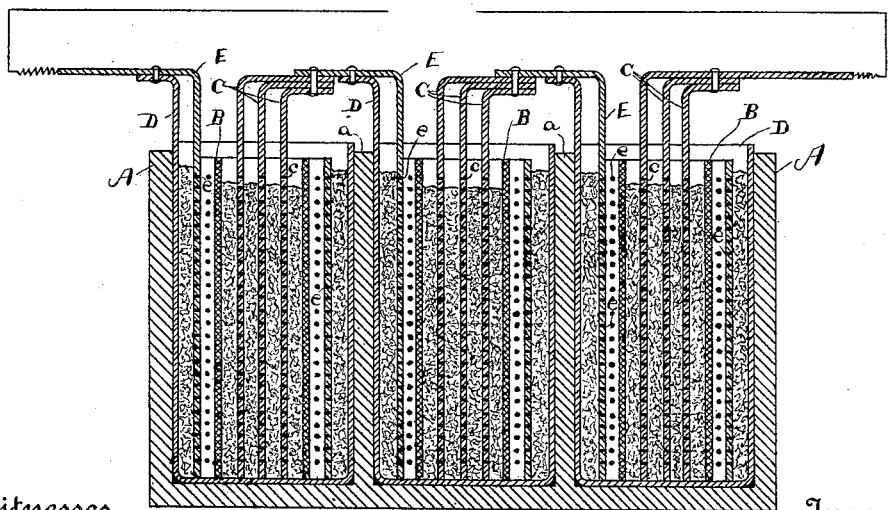

In the accompanying drawings, Figure 1 is a plan view of one cell of my improved form, and Fig. 2 is a longitudinal central section of a casing provided with combinations for three cells arranged side by side and suitably insulated from one another.

A represents a battery-casing, which may be made of wood, rubber, or other suitable material, the same being constructed to serve as a perfect insulator for the current as well as a receptacle for the battery material. This case or receptacle is designed for convenience to contain three different cells, and for this purpose is provided with three corresponding compartments subdivided by division-walls $a$.

Convenience in the handling of storage-batteries demands a casing that will accommodate more than a single cell, the size of cells as employed on street-cars being comparatively small, and of such size that three can be handled quite as conveniently and much more speedily when brought together within a common receptacle than they can be alone and separately.

This battery is constructed on the principle of those in which the porous pot is employed to separate the positive and negative elements of the cell, as well as to make the pot a medium for holding the active material. In this instance I have built the battery with the positive elements placed within the porous pot and the negative elements outside of said pot; but the order may be reversed and the negative placed inside and the positive outside, if found desirable.

B designates the porous pot, which may be of any desired size or form, according to the style of the battery which is built, and C represents three positive lead plates in said pot. Of course one or more of these plates may be used according to the size and style of the battery, or any little plates equivalent in lead or other suitable conductors, the plates being designed merely to serve the purpose of electrical conductors, and being in no sense supports for the active material. These plates, in order to afford a free lateral circulation, are provided with perforations $c$ over their surface.

D represents a lead cup, which is fitted closely within the walls of the cell and is liquid-tight. This cup is made, preferably, out of sheet-lead or like conducting metal with its edges joined, and forms a receptacle within the walls of the outer cell for all the material of the battery. Between this cup and the porous pot is a conductor E, of lead or other suitable material, which is open at both ends and is set into the cup so as to be separated from both the outside cup D and the porous pot B. Perforations $e$ are formed through this conductor over its entire surface to afford a perfectly-free circulation, but these perforations should not be so large as to allow the active material to work through them. The active material—such as red lead or other suitable preparation of material—is placed between the outer cup D and the said tube or conductor E, and the said space may be filled with the said active material alone, or may be incorporated with other suitable material, if any be found desirable, either to promote the action of the battery, to increase its storage capacity, to afford a freer circulation than the lead alone might afford, or for other purposes as they may suggest themselves in the use of the battery.

I have found that the battery works very well by merely filling the space between D and E with the red lead without other means being added to give porosity to afford free circulation. By this construction the lead surfaces next to the active material not only serve as a medium of confining the said material between them, but contribute storage capacity by reason of their exposed surfaces, the current affecting the said surfaces on the Planté principle, and thus to that extent contributing to the storage capacity of the cell.

Liquid in any suitable quantity is filled into the space between the porous cup D and the conductor E, and from this space it quickly works its way to all portions of the cell, permeating the active material. Between the plates D and E, I might reverse the position of the active material and the liquid; but this is not deemed to be as desirable an arrangement as the one illustrated and described. The cells thus fitted up have their respective conductors, positive and negative, united with the proper plates in the adjoining cells in the usual manner.

The partition-wall E might be a porous substance, like a porous pot, but then it would not serve as a conductor and would not be subject to electrolytic action on the side next to the active material, as it is when a suitable metallic plate is used.

It will be seen that by this construction of cells I so confine the active material that it cannot possibly escape and can use more or less material by arranging for more or less space in the porous pot and about it. The material is not adhered to any of the elements in the cell, but is simply poured into the open spaces provided for it, where it becomes permeated and saturated by the solution, and where the battery is changed is readily reached by the current for storage purposes.

Any suitable conductors other than the plates C may be employed, and the plate form of conductor is not essential. For example, they might be tubular, with perforations, so that they could be filled with solution. The metallic cup and the wall or partition when of metal serve as conductors for the outside active material.

Having thus described my invention, what I claim as new, and desire to secure by Letters Patent, is—

1. In a storage battery, an insulating-casing for the cell, having a cup-lining of conducting material, an inner wall of conducting material apart from said lining, and active material between said wall and lining, in combination with a battery element centrally within said case, substantially as described.

2. In a storage-battery, a battery-cell having an outside containing-cup of lead or like conducting material, a porous pot filled with active material and having conductors extending into the same, a partition between the said pot and said outside cup, and active material packed between said partition and cup, substantially as described.

3. In a storage-battery, a metallic containing-cup, a porous pot in said cup, and a walled chamber about the sides of said cup for holding active material, in combination with active material in said chamber and said pot, respectively, and conductors, substantially as described.

4. A containing-cup of lead or like material and a porous pot set in said cup, in combination with a metallic division-wall substantially midway between said parts, said wall provided with openings for the free circulation of the solution, active material in the pot and between the cup and wall, and conductors reaching into the pot, substantially as described.

Witness my hand to the foregoing specification this 9th day of July, 1890.

GEORGE A. WASHBURN.

Witnesses:
NELLIE L. McLANE,
H. T. FISHER.